US009122394B2

(12) United States Patent
Funabashi et al.

(10) Patent No.: US 9,122,394 B2
(45) Date of Patent: Sep. 1, 2015

(54) METHOD AND APPARATUS FOR AREA-EFFICIENT GRAPHICAL USER INTERFACE

(75) Inventors: Yoshimitsu Funabashi, Tokyo (JP); Shunsuke Kunieda, San Francisco, CA (US); Brian Johnson, San Francisco, CA (US); Jorge Furuya, Seattle, WA (US)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/353,801

(22) Filed: Jan. 19, 2012
(Under 37 CFR 1.47)

(65) Prior Publication Data
US 2013/0031515 A1  Jan. 31, 2013

Related U.S. Application Data

(60) Provisional application No. 61/441,335, filed on Feb. 10, 2011.

(51) Int. Cl.
*G06F 3/033*  (2013.01)
*G06F 3/048*  (2013.01)
*G06F 3/0488* (2013.01)
G06F 9/44   (2006.01)

(52) U.S. Cl.
CPC ........ *G06F 3/04886* (2013.01); *G06F 3/04883* (2013.01); *G06F 8/34* (2013.01)

(58) Field of Classification Search
CPC .... G06F 3/04886; G06F 8/34; G06F 3/04883

USPC .................................................. 715/863, 771
See application file for complete search history.

(56) References Cited

U.S. PATENT DOCUMENTS 7,433,179 B2 * 10/2008 Hisano et al. ............ 361/679.27
7,791,594 B2    9/2010 Dunko
8,180,295 B2 *  5/2012 Mao ............................ 455/41.3
(Continued)

FOREIGN PATENT DOCUMENTS

CN   101052939 A   10/2007
CN   101203821 A   6/2008
(Continued)

OTHER PUBLICATIONS

Archibald for iPhone and iPod Touch, http://blog.rakeingrass.com/?p=12, Apr. 12, 2009, pp. 1-5.*
(Continued)

*Primary Examiner* — Jennifer To
*Assistant Examiner* — Sunil Sundar
(74) *Attorney, Agent, or Firm* — Matthew B. Dernier, Esq.

(57) ABSTRACT

A GUI screen image is a standard screen image, and displays a first combined GUI area, which is a combination of a GUI of the directional keys and a GUI of a joystick, and a second combined GUI area, which is a combination of a GUI of the four-type operation buttons and a GUI of a joystick, at the lower left and at the lower right on the screen image, respectively. Depending on an area in the first combined GUI area or in the second combined GUI area to which a user newly touches, which of the combined GUI to be used is determined and a screen image is switched, and if a finger or a thumb detaches, the screen image switches back.

14 Claims, 10 Drawing Sheets

(56) References Cited

U.S. PATENT DOCUMENTS

| | | |
|---|---|---|
| 8,479,122 B2 | 7/2013 | Hotelling |
| 2006/0026521 A1 | 2/2006 | Hotelling |
| 2006/0034042 A1 | 2/2006 | Hisano |
| 2009/0193363 A1* | 7/2009 | Atherton ................... 715/835 |
| 2011/0234495 A1* | 9/2011 | Chan et al. ................. 345/163 |
| 2012/0169610 A1* | 7/2012 | Berkes et al. .............. 345/173 |
| 2012/0293440 A1 | 11/2012 | Hotelling |

FOREIGN PATENT DOCUMENTS

| | | |
|---|---|---|
| CN | 101211250 A | 7/2008 |
| CN | 100416454 C | 9/2008 |
| EP | 2284646 A1 | 2/2011 |
| JP | 2006053678 A | 2/2006 |
| JP | 2006127488 A | 5/2006 |

OTHER PUBLICATIONS

Office Action for corresponding JP Application No. 2012-007420, dated Jan. 29, 2013.

Office Action for corresponding MX Application No. MX/a/2012/001547, dated Nov. 21, 2014.

Office Action for corresponding CN Application No. 201210029184.5, dated May 6, 2015.

* cited by examiner

METHOD AND APPARATUS FOR AREA-EFFICIENT GRAPHICAL USER INTERFACE

CROSS REFERENCE TO RELATED APPLICATIONS

This application claims the benefit of U.S. Provisional Patent Application No. 61/441,335, filed Feb. 10, 2011, the entire disclosure of which is hereby incorporated by reference.

TECHNICAL FIELD

The present invention relates to an input device that receives an operation input by a user using a hand, an information processing device, and an input-value-acquiring method used in those devices.

BACKGROUND ART

Recent years, compact size information devices that are assumed to be taken along, such as, portable type game devices, mobile phones, PDAs (Personal Data Assistances), or the like have become popular. For such compact size devices, input means are limited because of the size limitation. As a result, input means or functions specialized for compact size devices have been developed in a unique way. For example, covering the surface of a display with a touch panel and allowing a finger or a touch pen to input give a user a feeling as if he/she directly operates an object or the like displayed on a display screen.

On the other hand, an environment for performing information processing using such compact size devices at a similar level as that of game consoles or personal computers, is also getting ready. For example, by allowing a user to operate a compact size device and by allowing a console device connected with the compact size device via a network to perform actual information processing, it is becoming possible to enjoy an advanced type game regardless of the whereabouts of the user. Further, it is becoming possible, by emulating a game for a console device, to play the game with a compact size device.

In this fashion, a technological direction, which allows a device to perform information processing such as a game or the like regardless of the size of the device or an environment in which the device is used, has been seen recent years. However, when attempting to perform such highly developed information processing by using a compact size device, a problem exists of poor operability resulted from the limitation on input means as described above.

The present invention addresses the aforementioned issue, and a purpose thereof is to provide a technology capable of implementing an input means having favorable operability even with the limitation in its size.

SUMMARY OF THE INVENTION

According to an embodiment of the present invention, an input device is provided. The input device includes: a GUI image generating unit operative to generate a GUI (Graphical User Interface) image; a display device operative to display the GUI image generated by the GUI image generating unit; a touch panel operative to cover the display device and operative to detect a position where a user makes contact with the display device; and an operation information converting unit operative to identify an operation performed by the user based on a correspondence relationship between a contact point detected by the touch panel and the GUI image being displayed, wherein the GUI image generating unit provides a combined GUI area in the GUI image, the combined GUI area combining a plurality of GUIs by a combined graphics that are a combination of at least part of graphics of the plurality of GUIs, and when a user newly makes contact with the combined GUI, the operation information converting unit specifies one GUI corresponding to a graphic that includes a point from which the contact is started, the one GUI included in the plurality of GUIs that are combined by the combined GUI, and the GUI image generating unit allows a plurality of GUIs to share a same detection area on the touch panel by switching the combined GUI to the one GUI identified by the operation information converting unit.

According to another embodiment of the present invention, an information processing device is provided. The information processing device includes: a GUI image generating unit operative to generate a GUI (Graphical User Interface) image; an information processing unit operative to perform information processing in accordance with an operation made to the GUI by a user; a display device operative to display a GUI image generated by the GUI image generating unit as an on-screen display on an output image generated as a result of information processing performed in the information processing device; a touch panel operative to cover the display device and operative to detect a position where a user makes contact with the display device; and an operation information converting unit operative to identify an operation performed by the user based on a correspondence relationship between a contact point detected by the touch panel and the GUI image being displayed, wherein the GUI image generating unit provides a combined GUI area in the GUI image, the combined GUI area combining a plurality of GUIs by a combined graphics that are a combination of at least part of graphics of the plurality of GUIs, and when a user newly makes contact with the combined GUI, the operation information converting unit identifies one GUI corresponding to a graphic that includes a point from which the contact is started, the one GUI included in the plurality of GUIs that are combined by the combined GUI, and the GUI image generating unit allows a plurality of GUIs to share a same detection area on the touch panel by switching the combined GUI to the one GUI identified by the operation information converting unit.

According to yet another embodiment of the present invention, an input-value-acquiring method is provided. The input value acquiring method includes: generating a GUI (Graphical User Interface) image; displaying the GUI image on a display device as an on-screen display on an output image generated as a result of information processing; detecting, by the touch panel that cover the display device, a position where a user makes contact; and identifying an operation performed by the user based on a correspondence relationship between a detected contact point and a GUI image being displayed, wherein generating of a GUI image provides a combined GUI area in the GUI image, the combined GUI area combining a plurality of GUIs by a combined graphics that are a combination of at least part of graphics of the plurality of GUIs, and when a user newly makes contact with the combined GUI, the identifying of an operation identifies the one GUI corresponding to a graphic that includes a point from which the contact is started, the one GUI included in the plurality of GUIs that are combined by the combined GUI, and the generating of the GUI image allows a plurality of GUIs to share a same detection area on the touch panel by switching the combined GUI to the one GUI identified.

Optional combinations of the aforementioned constituting elements, and implementations of the invention in the form of methods, apparatuses, systems, computer programs, or the like may also be practiced as additional modes of the present invention.

According to the present invention, wide range of operations can be implemented while keeping favorable operability even with a compact size device.

DETAILED DESCRIPTION OF THE INVENTION

Figure 1:
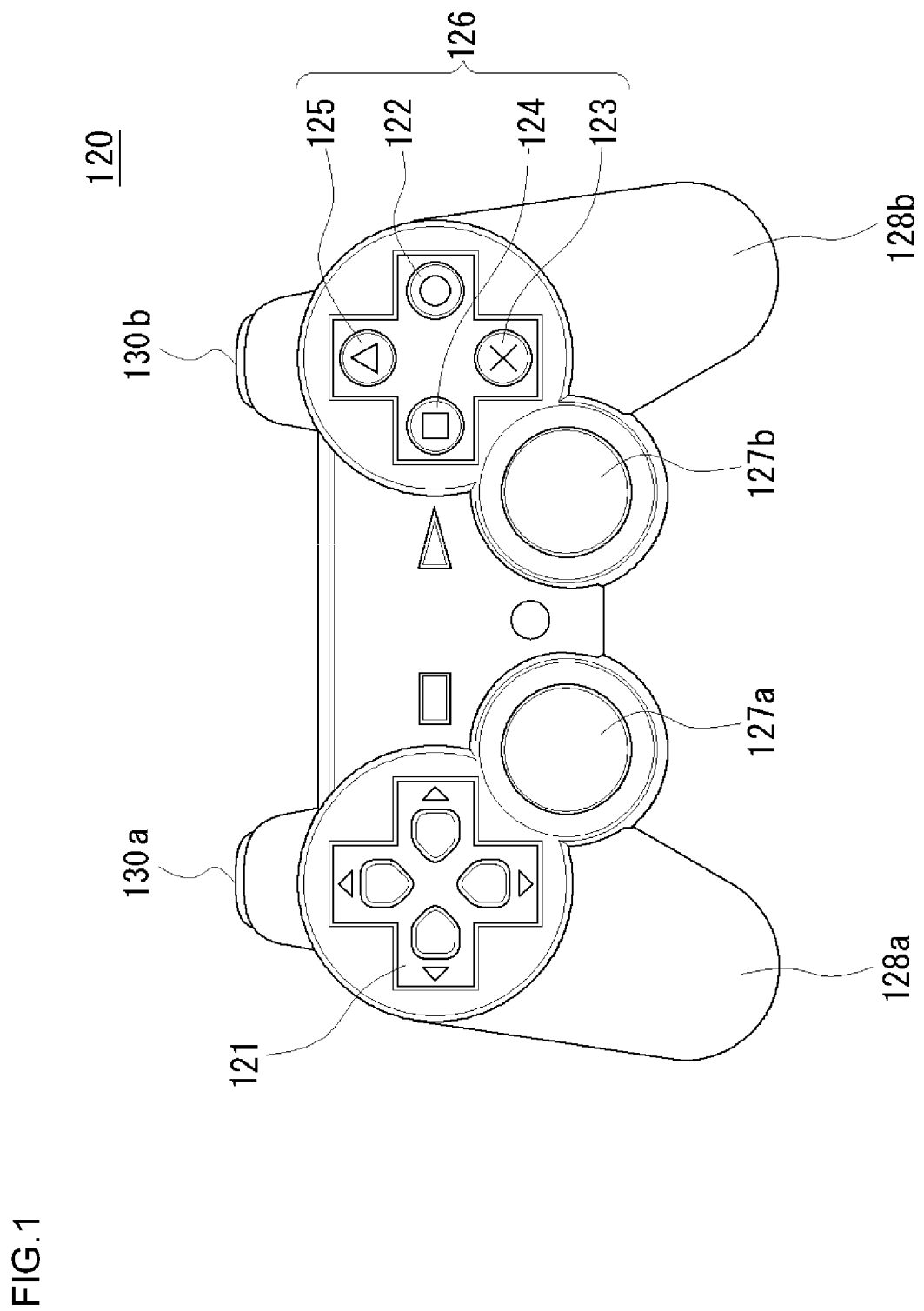
FIG. 1 shows an exemplary structure of a commonly used controller.

According to an embodiment, an input device in a compact size information device, such as, a mobile phone, a mobile terminal, or the like is implemented. The input device has operability similar as that of a controller of a game console, or the like. First, an explanation will be given on an example of a commonly used controller. FIG. 1 shows an exemplary structure of a commonly used controller. A controller 120 comprises directional keys 121, joysticks 127a and 127b, four-type operation buttons 126, L1/L2 buttons 130a, and R1/R2 buttons 130b, as operation means for allowing a user to manipulate. The four-type operation buttons 126 comprise a circle button 122, a cross button 123, a square button 124, and a triangle button 125.

The directional keys 121 are configured so as to allow a user to key in one of four directions (up, down left and right), or eight directions (up, down left and right and four directions between the aforementioned four directions), or to key in an arbitrary direction. For example, the directional keys 121 are used in order to move a cursor on a screen image of a display device, or to scroll various types of information on a screen image. To the four-type operation buttons 126, functions different among buttons are respectively allocated by an application program.

The joysticks 127a and 127b comprise a stick supported so as to be able to tilt in an arbitrary direction, and a sensor that detects the amount of tilt. The stick is biased by a biasing means (e.g., a spring or the like) towards a neutral position, and moves back to the neutral position when not manipulated. The sensor includes a variable resister, that changes its resistance value in accordance with the tilt of the stick, and an A/D converter circuit that converts the resistance value into a digital value. If the stick is tilted, the amounts of tilt in a plurality of reference directions are converted into digital values, respectively, and the values are transmitted to a game device or the like as operation signals.

The L1/L2 buttons 130a and the R1/R2 buttons 130b are configured with two buttons respectively, namely, an L1 button and an L2 button, and an R1 button and an R2 button. In both combinations, two buttons are disposed at an upper position and a lower position respectively on the side surface of the controller 120. For example, a button is used in order to change the direction of line of sight in a game, or used in order to add a different movement when the button is manipulated concurrently with another button. However, various functions are allocated also to these buttons by an application program.

A user holds a left grip 128a by the left hand and a right grip 128b by the right hand, and manipulates the controller 120. The directional keys 121, the joysticks 127a and 127b, and the four-type operation buttons 126 are provided on the top surface of the controller 120 so that the user can manipulate them while holding the left grip 128a and the right grip 128b by the left and right hands, respectively. The L1/L2 buttons 130a and the R1/R2 buttons 130b are provided on a surface positioned at the other side of the left grip 128a and the right grip 128b so that the buttons can be manipulated by the index fingers of the left and right hands.

Figure 2:
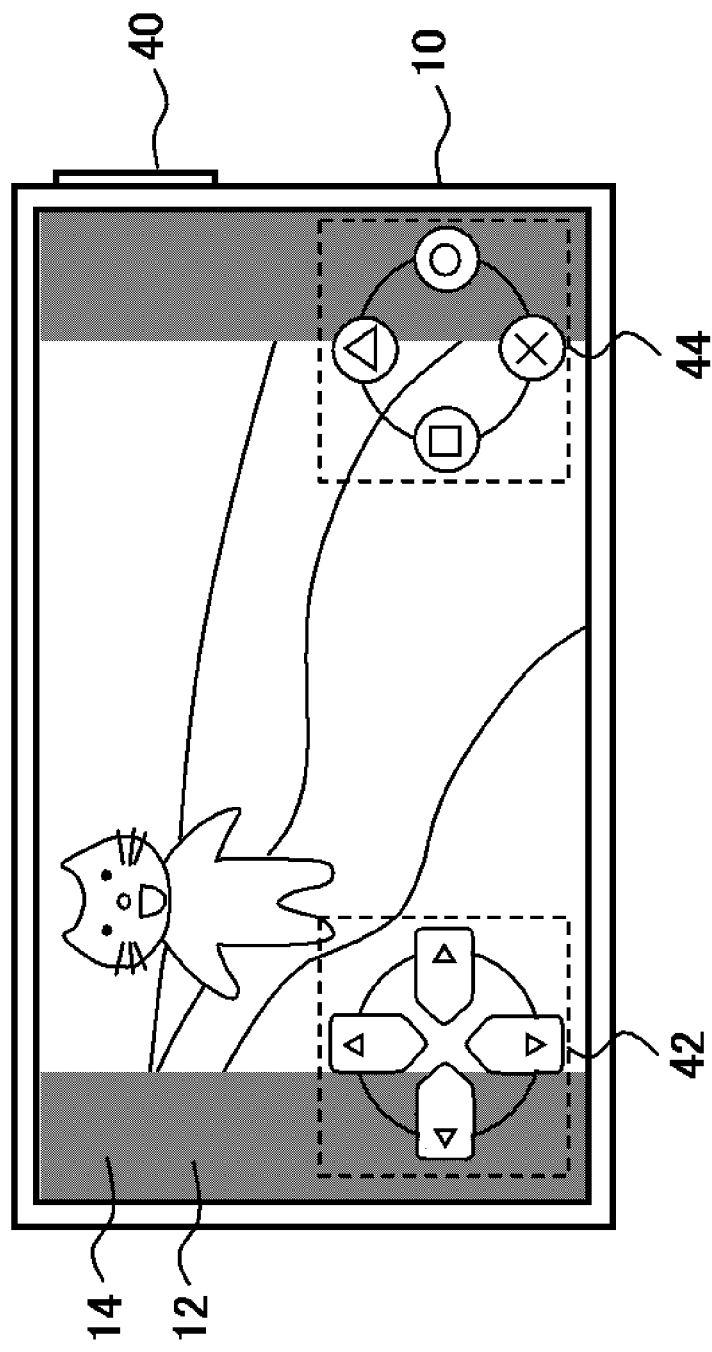
FIG. 2 shows an exemplary external view of an information processing device applying an input device according to an embodiment.

According to an embodiment, each operation means included in the controller shown in FIG. 1 is re-created on a plane surface as a GUI. An explanation will be given below on an input device according to the embodiment. FIG. 2 shows an exemplary external view of an information processing device applying the input device according to the embodiment. The information processing device 10 is a compact size device that can be carried by a user, and may be any one of a mobile phone, a PDA, a portable type game device, or the like. Alternatively, the information processing device 10 may be provided with a function, which is a combination of the functions of those devices. Therefore, the information processing device 10 may comprise various processing mechanisms in accordance with the functions. However, an explanation thereon will be omitted as appropriate since commonly used technologies can be applied thereto.

The information processing device 10 is provided with a configuration wherein a display 14 is placed on the front face of the main body and an activation switch 40 is placed on a side face. At the back side of the display 14, mechanisms required for a variety of types of information processing, such as, a CPU, a graphics processor unit, a sound processor, a memory, or the like are embedded (not shown). The display 14 may be any one of commonly used displays, such as, a liquid crystal display, an EL (electroluminescent) display, a plasma display, or the like. The top surface of the display 14 is covered with a touch panel 12. The touch panel 12 is implemented by any one of methods put into practical use, such as, a resistive type, an optical type, or a capacitive type.

In addition, the information processing device 10 may comprise a speaker for outputting sounds, an ear phone connecting terminal, an infrared port or wireless LAN mechanism for communicating with other devices, a battery box, or the like. However, those elements are not shown in FIG. 2.

On the display 14, a screen image that is necessary to allow an user to input an operation (e.g., a menu screen image, an icon, or the like), a screen image resulted from information processing (e.g., a game screen image, a moving image play back screen image, a text displaying screen image, a photograph displaying screen image, or the like) are displayed in accordance with a function. Further, a GUI (Graphical User Interface) for allowing a user to input an operation while watching such an image is displayed as an on-screen display.

The user inputs an operation into the information processing device 10 by touching the touch panel 12 by a thumb or a finger of a hand, or by sliding a thumb or a finger of a hand on the touch panel 12 as if he/she manipulates the GUI. In FIG. 2, a directional keys input area 42 that displays a graphic of the directional keys, and a button input area 44 that displays a graphic of the four-type operation buttons (i.e., the circle button, the cross button, the square button, and the triangle button) are equipped as the GUI. In FIG. 2, dashed lines surrounding the directional keys input area 42 and the button input area 44 are merely for illustrating of the boundaries of the areas and thus do not relate to actual displaying or functions. The same applies to the following figures.

For example, when selecting a desired item in a menu screen, first, a user moves an item targeted to be displayed with emphasis included in the names of items or icons displayed as a list by touching one of the directional keys in the directional keys input area 42 and confirms the item by touching the circle button in the button input area 44. Further, the user changes the direction of movement of a character appearing in a game by touching one of the directional keys in the directional keys input area 42. Alternatively, in a interactive type game, the user indicates the intention, for example "yes" by touching the circle button, or "no" by touching the cross button.

In this manner, an input operation implemented by providing the directional keys input area 42 and/or the button input area 44 can be changed in a various ways by allocating buttons in accordance with respective functions implemented by the information processing device 10. According to the embodiment, by re-creating an input means of a game console or a personal computer in a touch panel style, a variation of input operations in compact size information devices can be diversified as much as that of a game console or the like.

In addition, a game, which a user accustomed to play with a game console, can be also played with a compact size information device by similar operability without bringing discomfort to the user. The illustrated shapes or the marks of the directional keys input area 42 or the button input area 44 are merely shown as examples, thus the shapes or the marks are not intended to be limited to those shown in FIG. 2. The directional keys input area 42 or the button input area 44 can be replaced by other input means as appropriate in accordance with a controller intended to be re-create.

Figure 3:
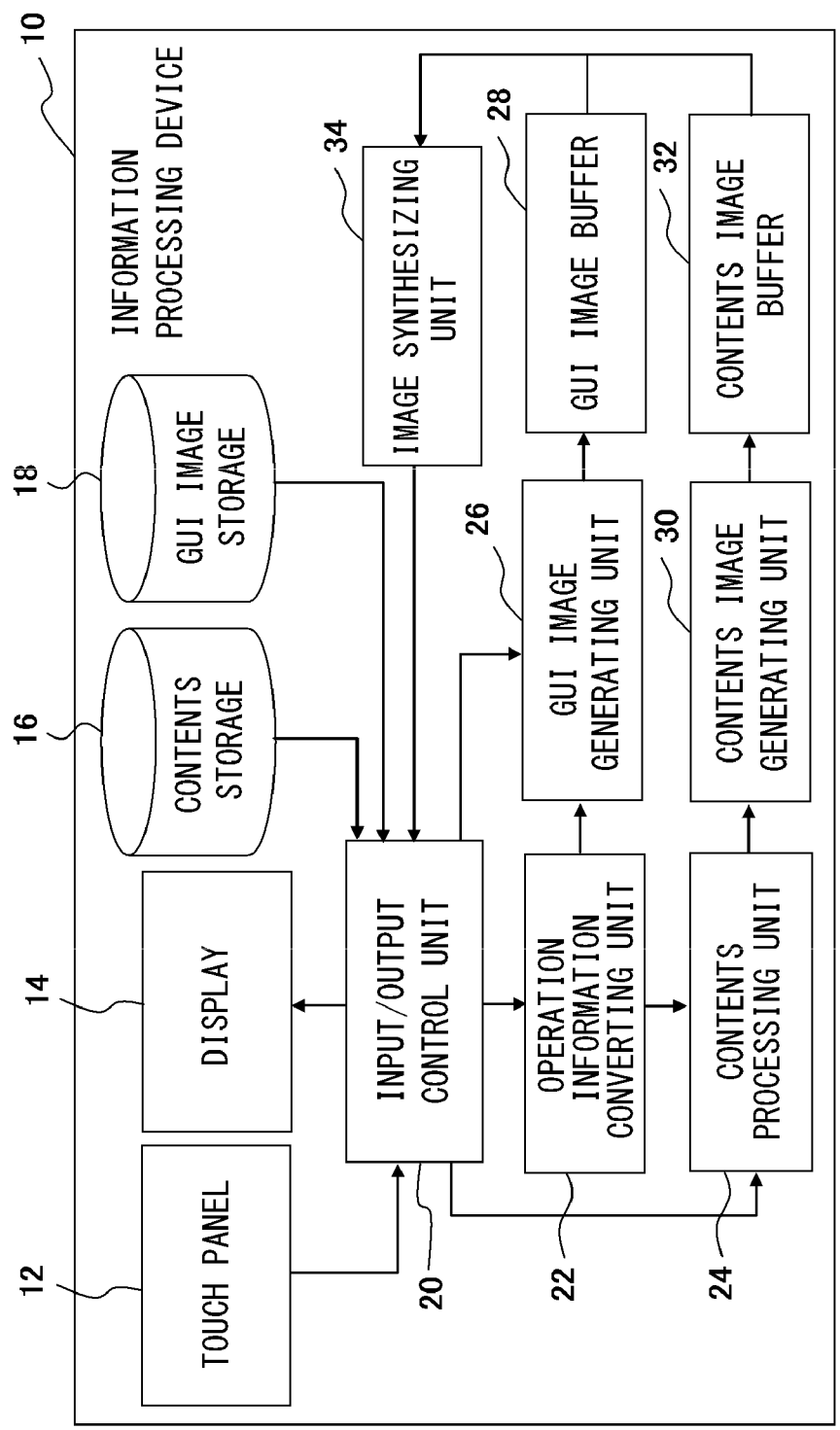
FIG. 3 shows the detailed structure of the information processing device according to the embodiment.

FIG. 3 shows the detailed structure of the information processing device 10. In addition to the touch panel 12 and the display 14 described above, the information processing device 10 includes a contents storage 16, a GUI image storage 18, an input/output control unit 20, an operation information converting unit 22, a contents processing unit 24, a GUI image generating unit 26, a GUI image buffer 28, a contents image generating unit 30, a contents image buffer 32, and an image synthesizing unit 34. The contents storage 16 stores programs of contents and/or various types of data. The GUI image storage 18 stores data of clip art graphics provided as a GUI. The input/output control unit 20 controls the reception of a signal input from the touch panel 12 and/or input/output of image data. The operation information converting unit 22 converts the signal input from the touch panel 12 to information on operation details. The contents processing unit 24 processes contents in accordance with the operation details. The GUI image generating unit 26 generates an image of a GUI. The GUI image buffer 28 stores the generated image of the GUI temporarily. The contents image generating unit 30 generates an image of the contents. The contents image buffer 32 temporarily stores the generated image of the contents. The image synthesizing unit 34 generates an image wherein the GUI image is displayed as an on-screen display on the image of contents.

The elements depicted in FIG. 3 as functional blocks for performing various processes are implemented in hardware such as a CPU, memory, or other LSI's, and in software such as a programs that process contents or performs image processing, etc. Therefore, it will be obvious to those skilled in the art that the functional blocks may be implemented in a variety of ways, by hardware only, software only, or a combination thereof.

The input/output control unit 20 is connected with the touch panel 12, the display 14, the contents storage 16, and the GUI image storage 18 by using an existing method, and controls input/output of data. An input signal received from the touch panel 12 is the coordinates of a contact point on which the user has touched in the touch panel 12, the movement pathway of the coordinates when the contact point moves continuously, or the like. Since a method for detecting the contact points on the touch panel 12 differs depending on the type of the panel, no reference is made to the method. Further, the input/output control unit 20 outputs a video signal of a display image to the display 14.

Further, the input/output control unit 20 accesses to the contents storage 16 and reads out a program or a variety of types of data required for processing of the contents. Further, the input/output control unit 20 accesses to the GUI image storage 18 and reads out the data of clip art graphics of the directional keys, the buttons, or the like described above. The types of "contents" is not limited provided that the contents can be processed and represented by a computer, such as a computer game, a movie, a piece of music, a novel, a photograph, or the like. The embodiment can be applicable to general information processing, such as, communication, schedule management, an address book, a spreadsheet, or the like, in addition to general "contents." The "contents" in the following explanation includes all of the aforementioned contents.

The contents storage 16 stores, in case that the contents is of a game, information on a program thereof, information on a player, a level achieved when the game is played last time, or the like. In case that the contents is of a movie or music, the contents storage 16 stores, compressed and encoded video data, audio data, a program for decoding and playing back the data, or the like. The contents storage 16 may be a hard disk drive or may be a combination of a removable recording medium (e.g., a memory card, a ROM disk, an optical disk, a magneto-optical disk, or the like) and a reader thereof.

The GUI image storage 18 is a storage (e.g., a hard disk drive or the like) that stores image data that can be used as a clip art graphics of the GUI image, such as the directional keys, the variety of types of buttons, or the like. As will be described later, an image of the GUI itself may be changed as a result of an operation on the GUI, according to the embodiment. Therefore, the GUI image storage 18 stores image data corresponding to such wide-ranging variations of GUIs.

The operation information converting unit 22 acquires a signal input through the touch panel 12 from the input/output control unit 20 and converts the coordinates of the contact point or the like included in the signal into information on operation details. As described above, according to the embodiment, a GUI itself may be changed as a result of an operation on the GUI. Therefore, the correspondence between the type of a GUI and a position to display the GUI is stored inside, in advance. Then, based on the acquired coordinates of the contact point and the type of a GUI being displayed currently, operation details intended by a user (e.g., the type of a pushed button, the degree and/or the direction of the operation, or the like) are identified.

The information on the operation details are notified to the contents processing unit 24 and the GUI image generating unit 26, respectively. The contents processing unit 24 performs, according to a program stored by the contents storage 16, a process required to proceed a game, or to play back a moving image and/or music in accordance with the operation details. An actual processing procedure is as similar as that performed commonly in accordance with the details of contents.

The GUI image generating unit 26 generates a new image of a GUI as need arises based on the operation details and stores the image into the GUI image buffer 28. Although specific examples of the change of an GUI image will be given later, for example, colors are changed or a button is shown as if it is pushed, so as to indicate that a user has contact with the touch panel, or a key and/or a button itself is replaced with that of another GUI.

Therefore, the GUI image generating unit 26 stores information that associates the operation details and a change to be made in an image, an identification information of an image to be newly used, or the like, inside. Then the GUI image generating unit 26 reads out image data of a necessary GUI from the GUI image storage 18 as appropriate, and generates data of a new on-screen image, so that a change associated with an operation that has been made on a GUI being displayed currently, is represented.

Depending on the operation details, in case a GUI does not need to be changed, the GUI image generating unit 26 does not have to perform a process of generating a new image. The contents image generating unit 30 generates data of an image to be output as a result of processing performed by the contents processing unit 24, and stores the data into the contents image buffer 32, accordingly.

By performing rendering processing using image data stored in the GUI image buffer 28 and image data stored in the contents image buffer 32, the image synthesizing unit 34 generates an image wherein a GUI image is displayed as an on-screen display on the image of contents and stores the image into an internal frame buffer, accordingly. By allowing a video signal corresponding to the image stored in the frame buffer to be transmitted to the display 14 under the control of the input/output control unit 20, an image corresponding to a GUI operation made by a user is displayed on the display 14.

Next, a specific example of the GUI screen image according to the embodiment will be presented. According to the embodiment, a GUI screen image is displayed as an on-screen display on a contents screen image, such as a game, or the like. Therefore, it is important to be able to acquire operability similar as that of a controller of a game console, or the like, without hindering the contents screen image.

According to the embodiment, a joystick is re-created as a GUI in addition to directional keys and four-type operation buttons. In this process, by configuring the re-created joystick to allow a user to input an arbitrary direction and an arbitrary quantity in a similar manner with that of an original joystick, the user can use either the joystick or the directional keys according to circumstances when instructing a direction in a similar manner with that of an original controller. This GUI makes an input of an arbitrary direction and an arbitrary quantity possible, and can be used for controlling the moving direction and/or the moving speed of a character appearing in a game, turning of a field of view, or the like. In the following explanation, an input made via a pseudo-joystick, which is represented as a GUI, is also referred to as a "joystick input".

If the three types of GUI described above, or more than three GUIs are disposed on a GUI screen image just as they are, the GUIs may hinder the visibility of a contents screen image. Therefore, according to the embodiment, by providing a combined GUI area that is a combination of a plurality of GUIs, the plurality of GUIs share a same detection area. Depending on the position of a contact point in the combined GUI area when a user newly touches the area, the entirety of the combined GUI area is determined to be used as which of the GUIs.

Figure 4:
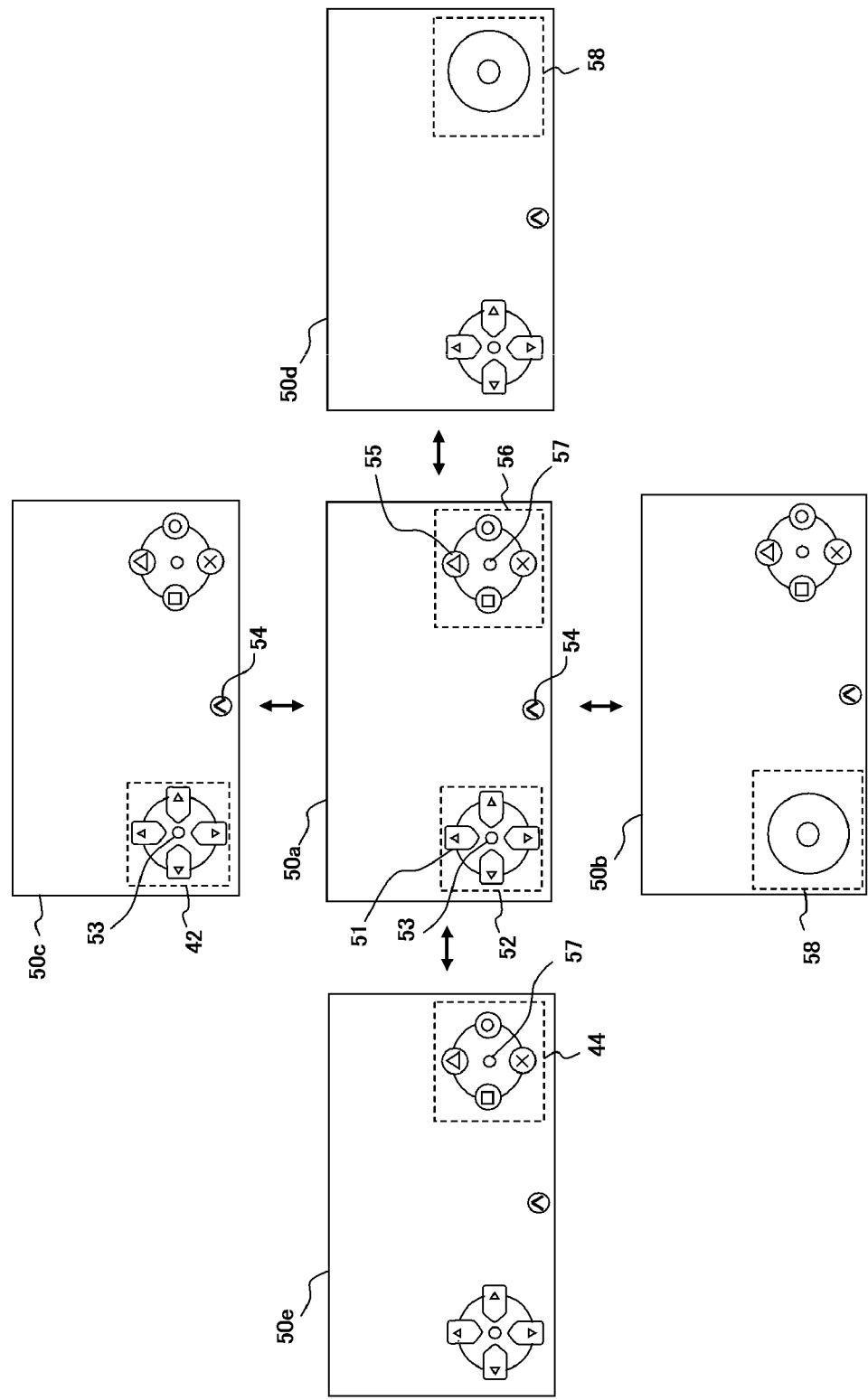
FIG. 4 shows an exemplary layout of GUIs in a GUI screen image according to the embodiment.

FIG. 4 shows an exemplary layout of the GUIs in a GUI screen image. All GUI screen images 50*a*, 50*b*, 50*c*, 50*d*, and 50*e* are a screen image that is displayed as an on-screen display on an image of contents on the display 14. An operation made by a user switches the screen image to be displayed between the GUI screen image 50*a*, and one of the GUI screen images 50*b*, 50*c*, 50*d*, and 50*e*. The GUI screen image 50*a* is a standard screen image, and displays a first combined GUI area 52 and a second combined GUI area 56 at the lower left and at the lower right on the screen image, respectively.

The first combined GUI area 52 is an area for a GUI that is a combination of a GUI of the directional keys and a GUI of a joystick, and has a same design with that of the directional keys input area 42 shown in FIG. 2. The first combined GUI area 52 is configured with a directional keys graphic 51 that is at least a part of a graphic of the GUI of the directional keys, and a joystick graphic 53 that is represented by a figure (e.g., a circle or the like) at the center of the directional keys graphic 51 and that is at least a part of a graphic of the GUI of the joystick.

The second combined GUI area 56 is an area for a GUI that is a combination of a GUI of the four-type operation buttons and a GUI of a joystick, and has a same design with that of the button input area 44 shown in FIG. 2, in a similar manner with that of the first combined GUI area 52. The second combined GUI area 56 is configured with an operation button graphic 55 that is at least a part of a graphic of the GUI of the four-type operation buttons and a joystick graphic 57 that is represented by a figure (e.g., a circle or the like) at the center of the operation button graphic 55, and that is at least a part of the graphic of the GUI of the joystick.

On the GUI screen image 50*a*, which is a standard screen image, if a user newly touches the joystick graphic 53 of the first combined GUI area 52, a process of receiving an input through the joystick is started, and the first combined GUI area 52 is switched to a joystick input area 58 that does not include a directional keys graphic 51 (GUI screen image 50*b*). More specifically, the process is performed by a continuous motion, i.e., if the user puts a thumb or a finger on the joystick graphic 53 of the first combined GUI area 52, the area is switched to the joystick input area 58, and by sliding the thumb or the finger on the touch panel without detaching it, the moving direction and the moving distance of the thumb or the finger is acquired as an input value.

During a time period when the thumb or the finger remains touching continuously, the area works as the joystick input area 58 and acquires an input value from the movement of the thumb or the finger, sequentially. If the user detaches the thumb or the finger, the area switches back to the first combined GUI area 52 (GUI screen image 50*a*).

On the other hand, on the GUI screen image 50*a*, if a user newly touches the directional keys graphic 51 of the first combined GUI area 52, a process of receiving an input through the directional keys is started, and the first combined GUI area 52 is switched to a directional keys input area 42

(GUI screen image 50*c*). Also in this case, during a time period when the thumb or the finger remains touching continuously, the area works as the directional keys input area 42 and receives an input via the directional keys, and when the user detaches the thumb or the finger, the area switches back to the first combined GUI area 52 (GUI screen image 50*a*).

However, the joystick graphic 53 may be kept displayed also in the directional keys input area 42 so that the first combined GUI area 52 and the directional keys input area 42 appear similarly as shown in FIG. 4. This eliminates the inconvenience of a disappearance and reappearance of the joystick graphic 53 even when the directional keys are touched in a discontinuous manner for inputs via the directional keys.

The second combined GUI area 56 also works in a similar manner, i.e., if a user newly touches the joystick graphic 57, a process of receiving an input through the joystick is started, and the area is switched to the joystick input area 58 that does not include a four-type operation button graphic 55 (GUI screen image 50*d*), and if the thumb or the finger is detached, the area switched back to the second combined GUI area 56 (GUI screen image 50*a*). While the thumb or the finger remains touching, the area works as the joystick input area 58 and tracks the movements of the thumb or the finger.

On the other hand, if a user newly touches the four-type operation button graphic 55 of the second combined GUI area 56, a process of receiving an input through the buttons is started, and the second combined GUI area 56 is switched to the button input area 44 (GUI screen image 50*e*). Then if the user detaches the thumb or the finger, the area switches back to the second combined GUI area 56 (GUI screen image 50*a*). Also in this process, the joystick graphic 57 may be kept displayed in the button input area 44 for the same reason with that of the directional keys input area 42.

In this manner, by enabling switching between the directional keys input area 42 and the joystick input area 58, and between the button input area 44 and the joystick input area 58, respectively, the size of an area occupied by a GUI image can be reduced. As a result, even when displayed as an on-screen display, hindrance to a contents screen image is small, and the contents screen image and a GUI can coexist in a limited space. Further, viewing that a stick is tilted in a desired direction while setting the center as a starting point in case of an actual joystick, by associating the motion of sliding a thumb or a finger from the center of an area with the activation of an input via the joystick, an action required for switching is natural.

Further, by configuring both of the first combined GUI area 52 at the lower left and the second combined GUI area 56 at the lower right to be switchable to the joystick input area 58, a combination of input means that are displayed concurrently can be changed, or a hand to be used for operation (i.e., a left hand or a right hand) can be determined in a flexible and prompt manner, depending on the type of contents, the details or a scene of a game, or the like.

In the above example, the GUIs of the directional keys input area 42 and the button input area 44 are sufficiently implemented by a GUI for on/off input that switches a function provided for each button to be on or off through contact or non-contact with a separated region that represents a commonly used button. Thus, the GUIs are not intended to be limited to direction instruction keys, a circle button, a cross button, a square button, and a triangle button. The GUI of the joystick input area 58 is also sufficiently implemented by a GUI for analogue input that receives an analogue value in accordance with a contact position in a certain area, and thus not intended to be limited to the function of joystick.

In either case, a GUI for on/off input and a GUI for analogue input are combined into a combined GUI. In the combined GUI, the graphic of the GUI for on/off input is displayed without change and an instruction for switching to the GUI for on/off input is received. Concurrently, a detection area for switching to the GUI for analogue input is defined as a small area, and the detection area is expanded after switching. This enables a switching operation from the combined GUI to respective GUIs and an operation on the respective GUIs to be performed naturally in a flow of a series of operations. In this process, when switching to the GUI for on/off input, the graphic for switching to the GUI for analogue input, which has been displayed on a part of the combined GUI, is kept displayed. This eliminates the inconvenience of a disappearance and a reappearance of the graphic during a time period when the GUI for on/off input is operated in a discontinuous manner.

In addition, a switching button 54 may be displayed on the GUI screen image 50*a*. Making contact with this switching button 54 may allow a button that has not been displayed (e.g., a button required in accordance with a function, such as, a select button for selecting a menu item, a start button for starting to play back a moving image, music, or the like) to appear from the bottom of the screen image. By configuring the embodiment in this manner, a button that is less used can be hidden and the contents screen image can be configured so as to be easily viewable.

Figure 5:
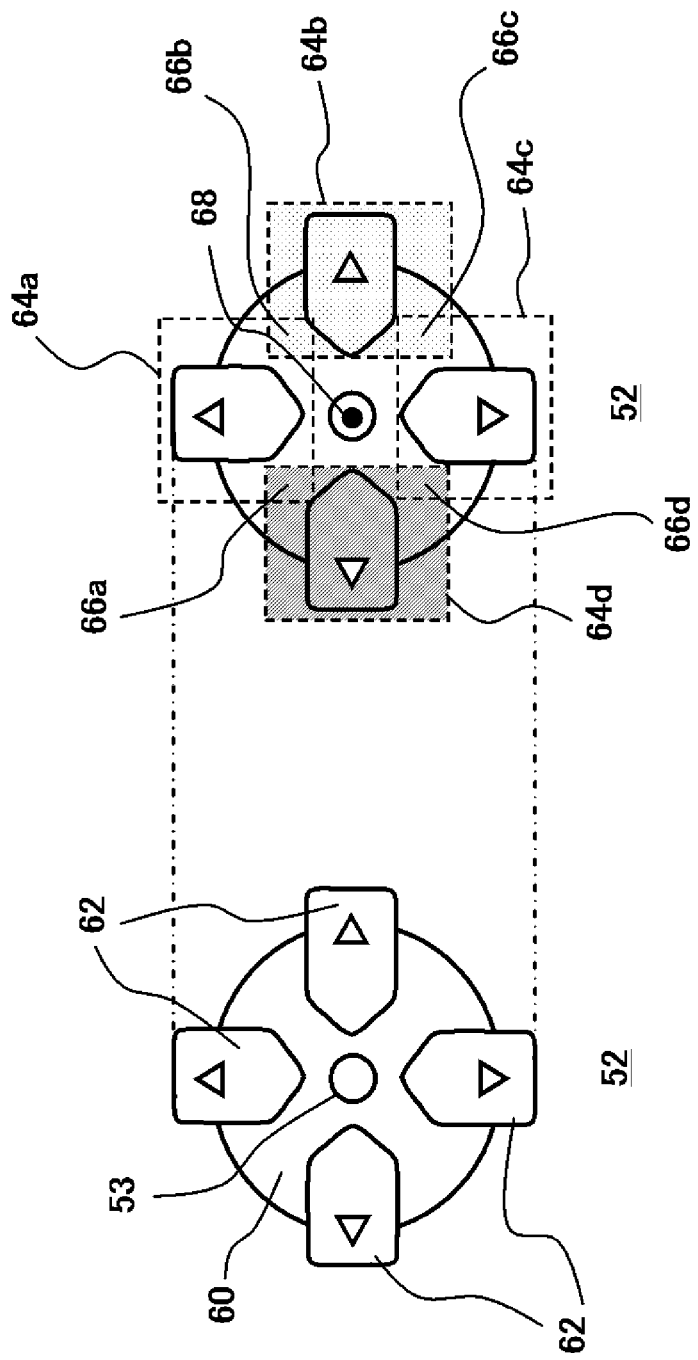
FIG. 5 is a diagram that illustrates an image to be displayed in a first combined GUI area and a detection area on a touch panel according to the embodiment.

FIG. 5 is a diagram that illustrates an image to be displayed in a first combined GUI area 52 and a detection area on a touch panel. The left part of FIG. 5 is an image of the first combined GUI area and the right part is an image wherein detection areas are shown on the image. The first combined GUI area 52 is configured with a circle 60, directional keys graphic 62 comprising four keys indicating four directions (up, down, left, and right) that are disposed on the circumference of the circle 60, and a joystick graphic 53 disposed at the center of the circle 60.

The circle 60 to be displayed on the first combined GUI area 52 is also displayed in the directional keys input area 42 and is for representing a sense of togetherness of the set of four keys two dimensionally, which an original controller can present by its three dimensional shape. By displaying such a circle, even when an image of contents displayed as a background is less tidy, the set of keys can be easily perceived as a GUI.

The circle 60 is configured to be capable of being displayed in a partially translucent manner, so that the circle does not block the contents screen image. The transmittance is configured so that the user can define the transmittance while taking the types of contents, or the like into account. By displaying a similar circle also in the second combined GUI area 56 and in the button input area 44, a sense of togetherness as a set is represented. The arrangement of colors of the directional keys or the four-type operation buttons is preferably a monotone base so as to prioritize colors of an image on the contents screen image.

The four keys of the directional keys graphic 62 are respectively associated with rectangular detection areas 64*a*, 64*b*, 64*c*, and 64*d* of predetermined size that surround graphic symbols of respective keys on the touch panel. Further, the joystick graphic 53 is associated with a detection area 68 positioned at the center of the circle 60. By defining the shape of the detection areas 64*a*, 64*b*, 64*c*, and 64*d* as a shape that can be defined by a mathematical expression (e.g., a triangle, a circle, or the like, besides the rectangle), the areas can be readily associated with the display of keys, regardless of the resolution of the display and/or the touch panel.

Further, by setting the size of the detection areas 64a, 64b, 64c, and 64d on the large side so as to include areas surrounding graphic symbols of respective keys, an operation can be detected even if a point of contact with a thumb or a finger is slightly deviated from the key, and concurrently, overlapping areas 66a, 66b, 66c, and 66d can be provided for adjacent detection areas. These overlapping areas 66a, 66b, 66c, and 66d are associated with four diagonal directions, that are mid directions of four directions, i.e., up, down, left, and right. This doubles the number of directions that can be input in comparison with the case where only a part of each key is set as a detection area, thus allows a user to instruct a direction in multi levels.

In case of the directional keys input area 42, detections areas corresponding to the directional keys are defined in a similar manner with that shown in FIG. 5. However, an area for detecting whether or not a user remains touching continuously, which is a criterion when switching from the directional keys input area 42 back to the first combined GUI area 52, is determined separately, for example as a predetermined concentric circle having a radius equal to or larger than that of the circle 60. This avoids, in case that a thumb or a finger of a user who is entering information through the directional keys moves via the center portion of the directional keys input area 42, moving back to the first combined GUI area 52 despites the user's intention, or switching back to the joystick input area 58. In case that a contact point departs from the detection area, the directional keys input area 42 is switched to the first combined GUI area 52.

Figure 6:
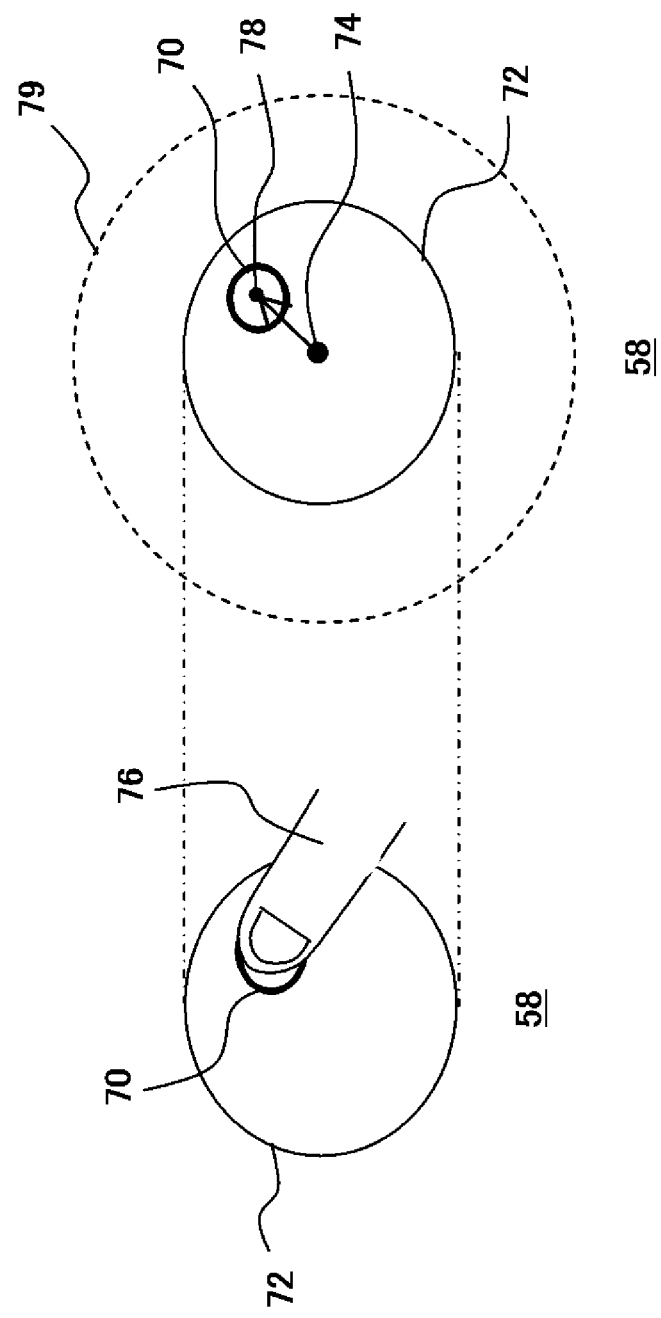
FIG. 6 is a diagram that illustrates an image to be displayed in a joystick input area and a manipulation method thereof according to the embodiment.

FIG. 6 is a diagram that illustrates an image to be displayed in a joystick input area 58 and an operation method thereof. As described above, the joystick input area 58 is displayed during a time period when a user slides a thumb or a finger on the touch panel without detaching from the panel, after touching the detection area 68 of the joystick graphic 53 of the first combined GUI area 52 or the like. In this process, as shown in the left part of FIG. 6, an indicator 70 (e.g., a circle or the like) is displayed at the position where the thumb or the finger 76 of the user touches. The indicator 70 has preferably a size and shape so as not to be hidden by the thumb or the finger. The indicator 70 will be furthermore easily perceivable by applying a sparkling image processing to an area surrounding the indicator, by shifting the position slightly so as to track the movement of the contact position, or by displaying the trail faintly.

The indicator 70 moves in accordance with the movement of the point in contact with the thumb or finger 76. Also in the joystick input area 58, a circle 72 having the same radius is displayed at the same position with the circles displayed in the first combined GUI area 52, the second combined GUI area 56, the directional keys input area 42, and the button input area 44. Since joystick graphics are provided in the first combined GUI area 52 and the second combined GUI area 56 in their central portions, the center of the circle is located at a position where a user first touches for a joystick input. Further, as shown in the right side of FIG. 6, the detection area 79 is defined as a concentric circle having a radius equal to or larger than that of the circle 72. If the contact point departs from the detection area 79, the area is switched back to the original first combined GUI area 52 or back to the second combined GUI area 56.

As is obvious from FIG. 5 and FIG. 6, the detection area 79 that receives a joystick input in the joystick input area 58 is an area, which is a concentric expansion of the detection area 68 for switching to the joystick input area 58 in the first combined GUI area 52. The same is applied to the relationships between a detection area for switching to the joystick input in the second combined GUI area 56 and a detection area after the switching.

The circle 72 may be displayed in a partially translucent manner, or may not be displayed. In the joystick input area 58, the coordinates of the contact point 78 is acquired continuously in predetermined time intervals, and a direction vector from the center of the circle 74 of the detection area 79 to the contact point 78 is set as an input value for each time point. The time interval for acquiring the coordinates is defined, for example, shorter than the time interval for displaying frames on the display 14.

The operation information converting unit 22 stores therein information that associates the direction from the center of the circle 74 to the contact point 78 of a direction vector and a tilting direction of an original joystick with each other, and the distance from the center 74 to the contact point 78 and a tilting quantity of the original joystick with each other. By referring the information, the operation information converting unit 22 converts a direction vector of each time point into a tilting direction and a tilting quantity of the original joystick, and notifies the contents processing unit 24 thereof. This enables contents processing unit 24 to perform processing in a similar manner with a case where an input is made through an original joystick. Alternatively, the direction or the distance may be directly used to process contents.

If the contact point reaches the circumference of the circle 72, an input value to be obtained is defined as an input value for a maximally tilted joystick. If the contact point departs from the circle 72, provided that the contact point is within the range of detection area 79, only the direction from the center of the circle 74 is acquired in accordance with the contact point, and the distance is defined to become saturated at the radius of the circle 72, regardless of the contact point. In this process, the indicator 70 is displayed so as to move in accordance with the direction of the contact point on the circumference of the circle 72. In this manner, by providing the joystick input area 58, an input means having a small difference in an operation method and operability with an original joystick can be implemented on a plane surface. Further, by disabling the displaying of the circle 72, or by displaying the circle 72 in a partially translucent manner, an effect on a contents image screen can be minimized while an arbitrary direction and an arbitrary quantity can be input.

Figure 7:
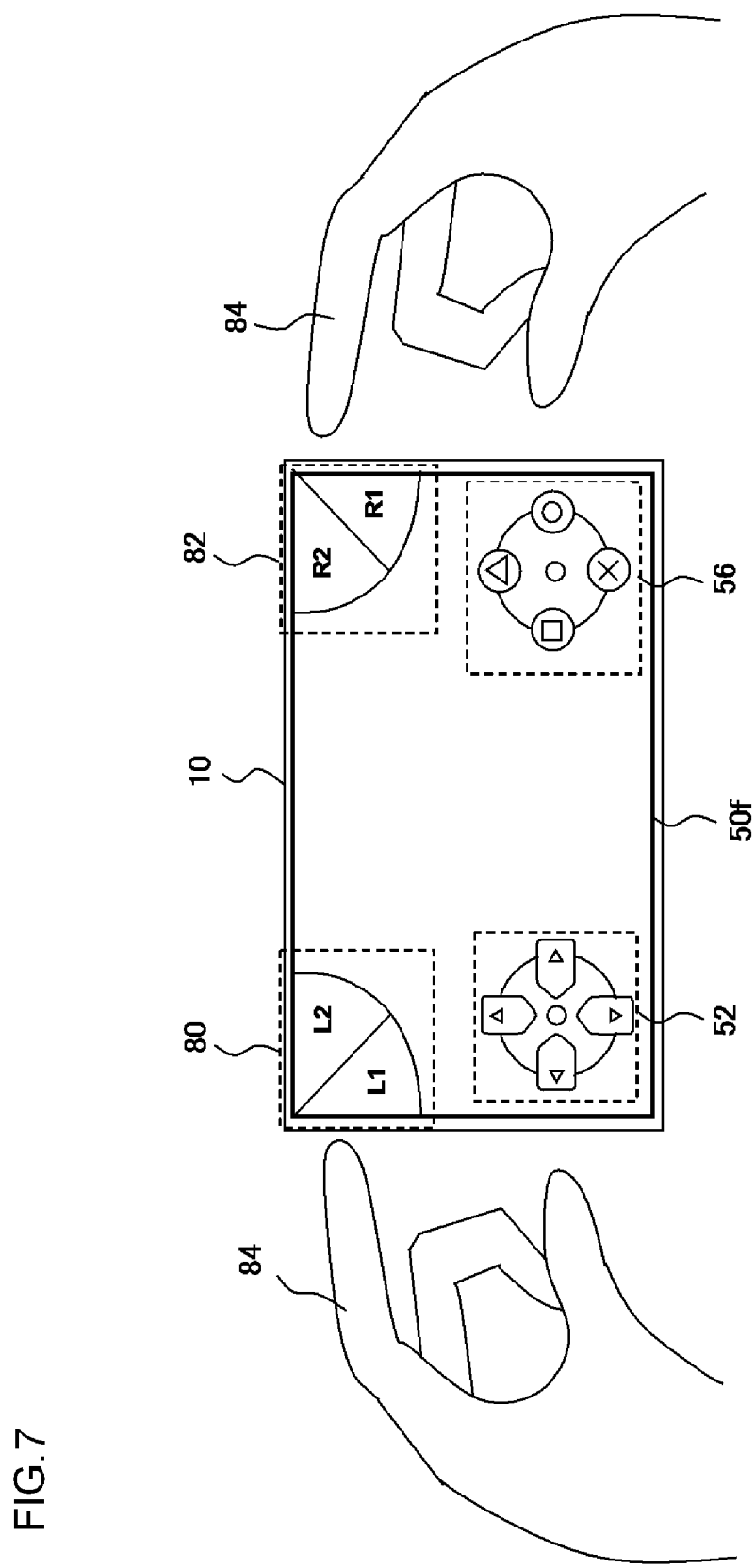
FIG. 7 shows a variation of the GUI screen image according to the embodiment.

FIG. 7 shows a variation of the GUI screen image. A GUI screen image 50f of the information processing device 10 in FIG. 7 includes a first combined GUI area 52 at the lower left on the screen image and a second combined GUI area 56 at the lower right on the screen image, in a similar manner with the GUI screen image 50a shown in FIG. 4. The GUI screen image 50f further includes an L1/L2 button input area 80 at the upper left on the screen and an R1/R2 button input area 82 at the upper right on the screen. The L1/L2 button input area 80 is configured so as to include buttons corresponding to the L1 button and the L2 button shown in FIG. 1. The R1/R2 button input area 82 is configured so as to include buttons corresponding to the R1 button and the R2 button shown in FIG. 1.

According to the embodiment, it is assumed that a user operates a GUI with a thumb or a finger of the left and right hands 84 while holding the main body of the information processing device 10 with the left and right hands 84 as shown in FIG. 7. Therefore, disposing the first combined GUI area 52 and the second combined GUI area 56 at the lower left and at the lower right on the screen image allows a thumb to manipulate the areas.

Further, disposing the L1/L2 button input area 80 and the R1/R2 button input area 82 at the upper left and at the upper right on the screen image as shown in FIG. 7 allows an index finger to manipulate. Although FIG. 7 shows the information processing device 10 and the hands 84 separately so that the GUI screen image 50*f* is easily viewed, when holding the device in practice, thumbs and index fingers are positioned on the GUI screen image 50*f*.

By laying out the GUIs in this manner, a user can operate the information processing device 10 without distortion while holding the device, and in addition, the user can operate two areas or more than two areas of four areas concurrently. The L1/L2 button input area 80 and the R1/R2 button input area 82 are formed in the shape of circle sectors, whereby the center angles of respective circle sectors are the right angles of the two upper corners of the screen, and internally dividing the center angles so as to divide the sectors into two sectors respectively enables the discrimination between the L1 button and the L2 button, and between the R1 button and the R2 button, as shown in FIG. 7.

In case of holding the information processing device 10 in the shape as shown in FIG. 7, the bases of the index fingers of the hands 84 is typically placed opposite the middle fingers so as to form shapes for pinching the housing of the information processing device 10. Therefore, ranges where the index fingers can operate the touch screen without distortion are in the shapes of circle sectors, which are formed by bending upper parts from joints of the index fingers. By defining the shapes of the L1/L2 button input area 80 and the R1/R2 button input area 82 as circle sectors, a user can touch the L1/L2 button and the R1/R2 button in a distinguishable manner by merely changing the angle of bending produced by the fingers. More than two buttons may be provided by changing the number of partitions of the sector shaped areas.

Angles into which the original angle is divided internally may not be equal with each other. For example, in consideration of a characteristic that the smaller an angle of bending produced by a finger is, the easier the finger can be controlled, the angle of a sector of a button at the upper side of the screen may be set small, and the angle of a sector of a button at a position nearer to the left or right side of the screen may be set larger. Instead of the shape of the buttons, the dispositions of the buttons may be configured so as to suit to the range of movement of the fingers.

Figure 8:
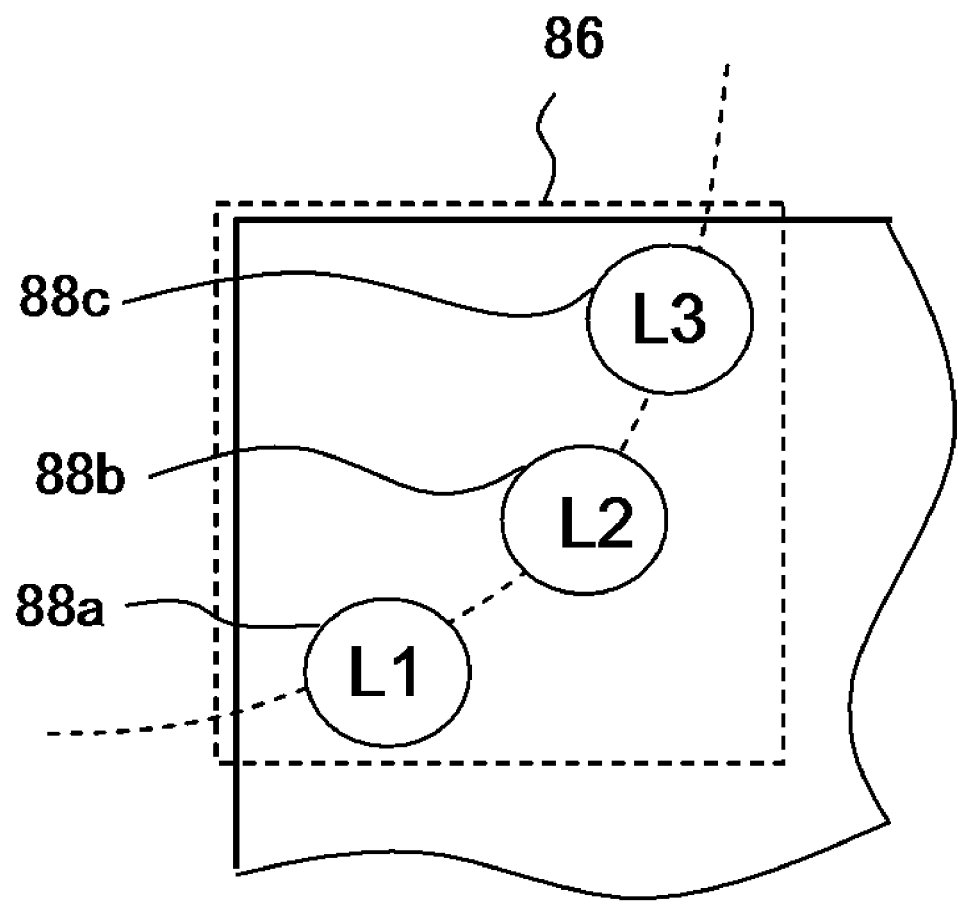
FIG. 8 shows a variation of an L1/L2 button input area according to the embodiment.

FIG. 8 shows a variation of the L1/L2 button input area. Although three buttons, i.e., an L1 button 88*a*, an L2 button 88*b*, and an L3 button 88*c* are provided in the L1/L2/L3 button input area 86 shown in FIG. 8 as an example, the number of the buttons are not limited. On one hand the shape of each button is set independently from each other, on the other hand, the buttons are laid out so as to form an arc shape. Although in FIG. 8, the shape of each button is set as a circular form, the shape may be a rectangle or the like. In this manner, even the shape of the buttons are similar with that of common cases, by arranging buttons in an arc shape, a user can touch buttons without distortion in a distinguishable manner depending on the angle of bending produced by an index finger. Also in this example, the further the position of a button is from the upper side of the screen and the nearer the position is to the left side, the larger the spacing between the button and an adjacent button may be set. The same is applied to buttons at an opposed position, such as, the R1/R2 button shown in FIG. 7, or the like.

Figure 9:
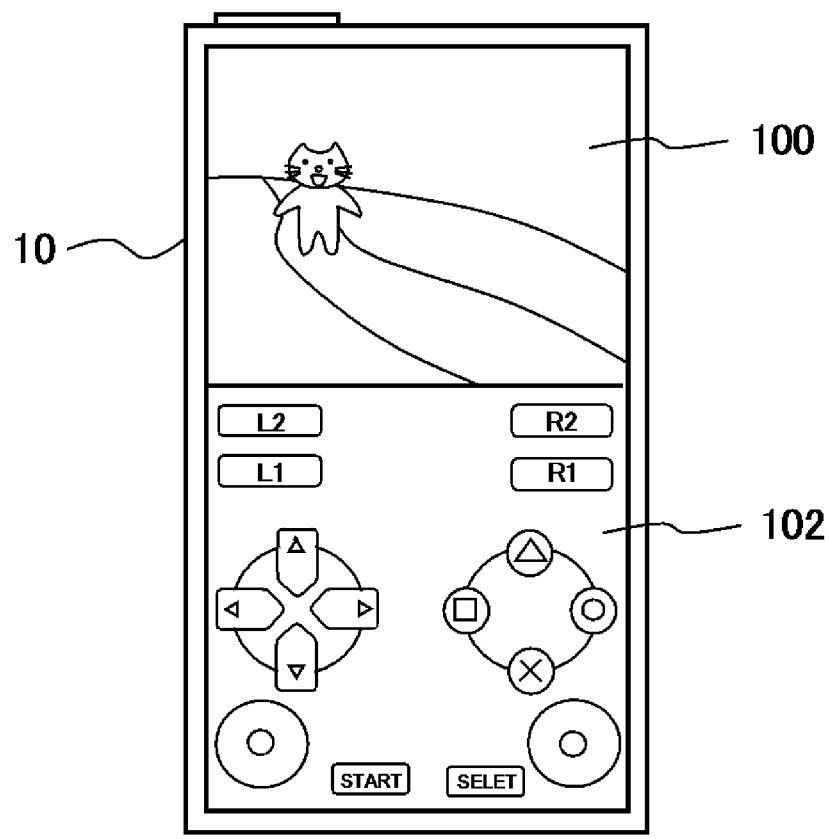
FIG. 9 shows another exemplary layout of the GUI screen image and a contents screen image according to the embodiment.

FIG. 9 shows another exemplary layout of the GUI screen image and a contents screen image. In the embodiment described above, a GUI screen image is displayed as an on-screen image on a contents screen image. In the example shown in FIG. 9, the information processing device 10 is used while oriented vertically long, and a contents screen image 100 and a GUI screen image 102 are displayed at separate areas. Also in this case, the information processing device 10 may be configured in a similar manner as shown in FIG. 3, and the image synthesizing unit 34 performs synthesis by rendering the contents image and the GUI image in separate predetermined areas, respectively. Operation methods of a variety of types of GUIs are also implemented in a similar manner as described above.

In this case, although the area size for displaying the contents screen image 100 becomes smaller, an GUI screen image does not hide the contents screen image 100, thus the directional keys input area, the button input area, the joystick input area, or the like may be displayed concurrently without serious inconvenience. Further, this case has a high probability that the shape of a hand holding the device and/or a thumb or a finger that operates the input areas differ from the case described above. Therefore, the L1 button, the L2 button, the R1 button and the R2 button may not be a circle sector shape, arranged in an arc shape, or the like.

Figure 10:
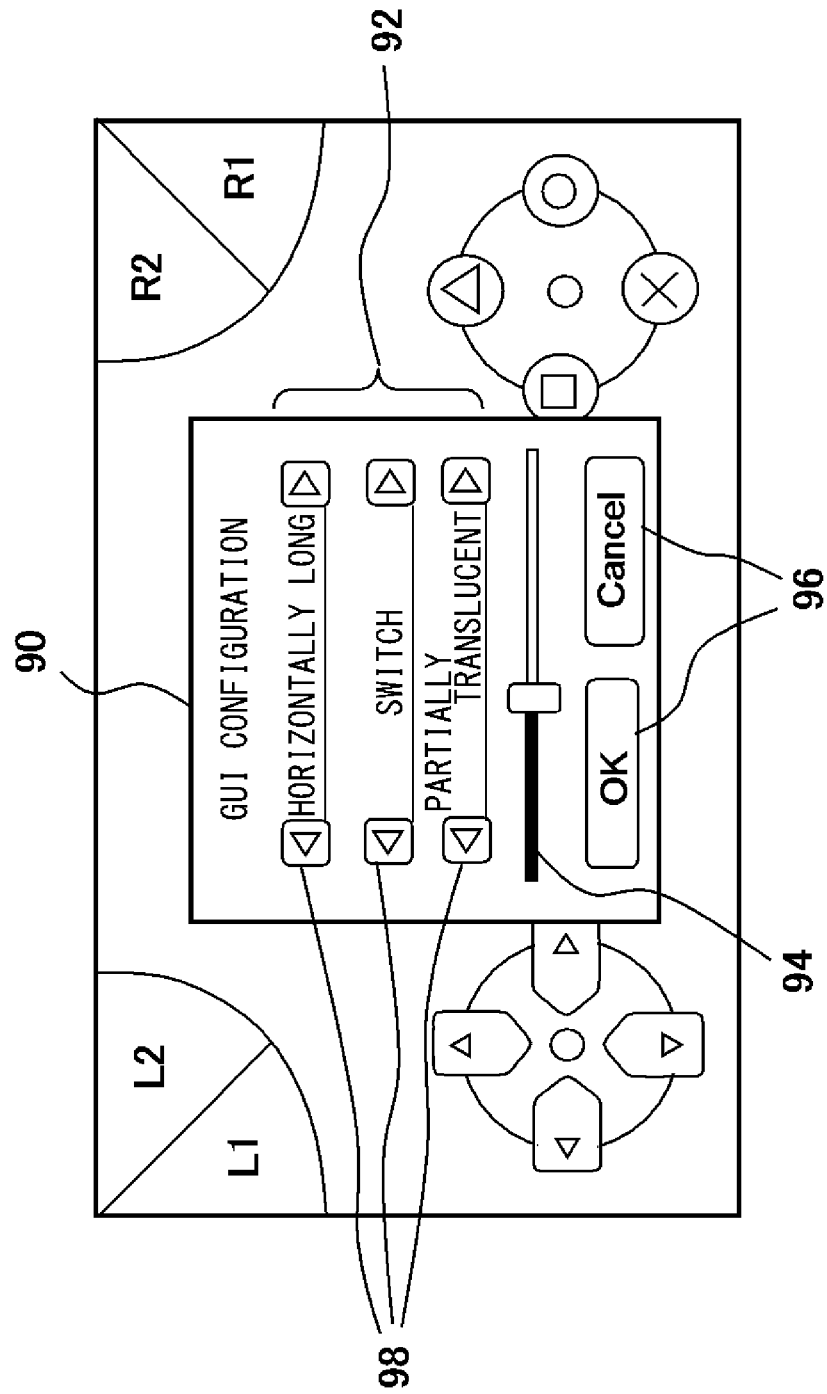
FIG. 10 shows an exemplary configuration screen image of the display mode of the GUI according to the embodiment.

The information processing device 10 is configured so that a user can define whether to use the device 10 while orienting vertically long, or orienting horizontally long by taking into account the type of contents, the type of a game, or the like. FIG. 10 shows an exemplary configuration screen image of the display mode of the GUIs. A GUI configuration screen image 90 is set so that, whichever before starting the processing of contents or in the middle of the process, a user can call the GUI configuration screen image 90 anytime by touching a predetermined button of a GUI, and the GUI configuration screen image 90 is displayed as an additional on screen display. Alternatively, a menu screen may be called first, and then the GUI configuration screen image 90 may be called by selecting from the menu.

The GUI configuration screen image 90 includes a configuration detail displaying field 92, a transmission factor defining bar 94, and an ok/cancel button 96. The configuration detail displaying field 92 displays the details of a configuration, such as: a) the orientation of the information processing device 10; b) a mode setting whether the joystick input area 58 is switched with the directional keys input area 42 and/or the button input area 44, or the joystick input area 58 is regularly displayed; c) whether or not a circle displayed in the directional keys input area 42 and/or the button input area 44 is displayed in a partially translucent manner, and the color of the circle; or the like. The transmission factor defining bar 94 defines the transmittance of the circle in case the circle is displayed in a partially translucent manner. The ok/cancel button 96 allows a user to confirm the detail of configuration or to cancel a change of configuration.

In the example of the configuration detail displaying field 92 shown in FIG. 10, a configuration is defined wherein the information processing device 10 is used while oriented horizontally long, and a mode is adopted wherein the joystick input area 58 is switched with the directional keys input area 42 and/or the button input area 44, and the circles included in the GUIs are set so as to be displayed in a partially translucent manner.

By calling the GUI configuration screen image 90 when a user would like to change a configuration and by touching the direction instruction button 98 displayed in the configuration detail displaying field 92 for each item, the current configuration that has been displayed is switched to displaying of another candidate. If a desired configuration is displayed, the user confirms the configuration by touching the OK button included in the ok/cancel button 96. In case of displaying the circles in a partially translucent manner, the user also adjusts the transmission factor defining bar 94 as appropriate.

In this manner, by allowing a user to easily change the configuration of the display mode of a GUI, the information processing device can be operated in an optimal environment in accordance with the type of contents, the details or a scene of a game, or the like, and in accordance with the preference of individual users. Therefore, even when the device is oriented horizontally long, the directional keys input area 42, the button input area 44, and the joystick input area 58 can be concurrently displayed easily, or the shape of the L1/L2 button input area 80 and the R1/R2 button input area 82 can be set as a rectangle, easily.

According to the embodiment described above, a GUI screen image is displayed as an on-screen display on a display screen of the information processing device. The GUI displayed in this process is a two dimensional representation of directional keys, a variety of types of buttons, a joystick or the like that have been formed three dimensionally as a conventional controller of a game device. In this manner, even a user who gets used to using a three dimensional controller, can operates easily with a similar operation means and similar operability.

The image of each GUI is disposed near a corner of the screen so that the area of a hidden region in an output image of contents becomes small. In addition, by providing a combined GUI area, and by enabling switching to individual GUIs depending on which GUI's graphic includes a point from which contact by a user is started, a same detection area is shared by a plurality of GUIs. Further a GUI, which can readily call a GUI that is basically defined as a non-displayed GUI, is provided. By these characteristics, a contents screen image and a GUI screen image can coexist naturally.

As a mode for providing a combined GUI area, a graphic of a joystick is provided in a central portion of a graphic configured with directional keys or four buttons, and by sliding a thumb or a finger from a point in the central portion where contact is started, an input of an arbitrary direction and an arbitrary quantity can be implemented. Such continuous motion resembles a manipulation of putting a thumb or a finger on a stick of an original joystick input device and tilting the stick, thus brings less discomfort to a user in switching of GUIs or in operation.

Further, disposing GUIs at the lower left, at the lower right, at the upper left, and at the upper right on a screen image in correspondence with the positions of thumbs and fingers that hold the information processing device enables a natural operation using thumbs and/or index fingers of both hands. In addition, forming a plurality of buttons disposed at the upper left and at the upper right, which are likely to be operated by index fingers, as continuous circle-sector-shaped area, or by disposing the plurality of buttons in an arc shape while taking the range of movement of index fingers into account, a user can touch the buttons in a distinguishable manner without distortion.

By allowing a user to configure the orientation of the information processing device, whether or not to switch GUIs, or whether or not to display a part of an image constituting a GUI in a partially translucent manner, an operation environment that agrees with the type of contents, the preference of a user, or the like can be readily implemented.

Given above is an explanation based on the exemplary embodiments. These embodiments are intended to be illustrative only and it will be obvious to those skilled in the art that various modifications to constituting elements and processes could be developed and that such modifications are also within the scope of the present invention.

DESCRIPTION OF REFERENCE SYMBOLS

10 information processing device, 12 touch panel, 14 display, 16 contents storage, 18 GUI image storage, 20 input/output control unit, 22 operation information converting unit, 24 contents processing unit, 26 GUI image generating unit, 28 GUI image buffer, 30 contents image generating unit, 32 contents image buffer, 34 image synthesizing unit, 50a GUI screen image, 52 first combined GUI area, 53 GUI of joystick, 54 switching button, 56 second combined GUI area, 58 joystick input area, 64a detection area, 66a overlapping area, 70 indicator, 79 detection area, 80 L1/L2 button input area, 82 R1/R2 button input area, 86 L1/L2/L3 button input area, 90 GUI configuration screen image, 92 configuration detail displaying field, 94 transmission factor defining bar.

The invention claimed is:

1. An apparatus implementing an input device, comprising:
at least one microprocessor and at least one computer memory containing computer code that is executed by the microprocessor to carry out one or more of the following elements:
a GUI image generating unit operative to generate a GUI (Graphical User Interface) image, including at least one combined GUI image area, wherein the combined GUI image area includes at least a first GUI graphic and a second GUI graphic, representing at least a first GUI operation area and a second GUI operation area, respectively, wherein: (i) the second GUI graphic includes a directional keys graphic that corresponds to the second GUI operational area, which includes directional keys, wherein a plurality of direction instruction keys are disposed on the circumference of a circle, (ii) the first GUI graphic includes a joystick graphic that corresponds to the first GUI operational area, which includes a pseudo-joystick receiving an input of an arbitrary direction and an arbitrary quantity, and (iii) the joystick graphic is disposed at the center of the directional keys graphic in the combined GUI image area;
a display device operative to display the combined GUI image, and the at least first and second GUI operation areas;
a touch panel operative to cover the display device and operative to detect a position where a user makes contact with the display device; and
an operation information converting unit operative to identify an operation performed by the user based on a correspondence relationship between a contact point detected by the touch panel and the GUI image being displayed, such that when the user makes contact with one of the at least first and second GUI graphics within the combined GUI image area on the touch panel, the corresponding one of the at least first and second GUI operation areas is selected and is displayed in place of the combined GUI image area, wherein:
when the user selects the second GUI graphic within the combined GUI image area and the second GUI operation area is displayed in place of the combined GUI image area, the GUI image generating unit operates to display at least a portion of the first GUI graphic from the combined GUI image area within the second GUI operation area, such that a touch selection by the user of the at least a portion of the first GUI graphic causes the first GUI operation area to be displayed in place of the second GUI operation area, and
when the user selects the first GUI graphic within the combined GUI image area and the first GUI operation area is displayed in place of the combined GUI image area, the GUI image generating unit operates to prohibit display of any graphic that would permit a touch selection by the user to cause the second GUI operation area to be displayed in place of the first GUI operation area.

2. The apparatus according to claim 1, wherein
at least the first GUI operation area requires a continuous touch by the user in order to produce an analogue value in accordance with the continuous touch and movement of the contact point, and
a detection area in the combined GUI image area is provided for switching to the first GUI operation area and is smaller than a detection area of the first GUI operation area after the switching from the combined GUI image area.

3. The apparatus according to claim 2, wherein at least the second GUI operation area includes a function provided at the contact point to be on or off through contact/non-contact.

4. The apparatus according to claim 1, wherein, when a continuous contact to the selected one of the at least first and second GUI operation areas is terminated, the GUI image generating unit switches back to the combined GUI image area.

5. The apparatus according to claim 1, wherein:
the first GUI operation area includes an analogue input GUI operation area that receives an analogue value in accordance with the contact point, and
the second GUI operation area includes an on/off input GUI operation area that switches a function provided at the contact point to be on or off through contact/non-contact.

6. The apparatus according to claim 1, wherein the operation information converting unit sequentially acquires the direction and distance from the point where the contact is started to a current contact point, and sets the acquired value as input values of direction and quantity, during a time period when the first GUI operation area of the pseudo-joystick is selected.

7. The apparatus according to claim 1, wherein the display device displays the GUI image generated by the GUI image generating unit as an on-screen display on an output image generated as a result of information processing performed in an information processing device with which the input device is connected.

8. The apparatus according to claim 1, wherein the GUI image generating unit provides a plurality of separate combined GUI image areas on one screen image.

9. The apparatus according to claim 1, wherein the GUI image generating unit displays an indicator that represents a point currently in contact by a user, during a time period when the first GUI operation area of the pseudo-joystick is selected.

10. An apparatus implementing an information processing device, comprising:
at least one microprocessor and at least one computer memory containing computer code that is executed by the microprocessor to carry out one or more of the following elements:
a GUI image generating unit operative to generate a GUI (Graphical User Interface) image, including at least one combined GUI image area, wherein the combined GUI image area includes at least a first GUI graphic and a second GUI graphic, representing at least a first GUI operation area and a second GUI operation area, respectively, wherein: (i) the second GUI graphic includes a directional keys graphic that corresponds to the second GUI operational area, which includes directional keys, wherein a plurality of direction instruction keys are disposed on the circumference of a circle, (ii) the first GUI graphic includes a joystick graphic that corresponds to the first GUI operational area, which includes a pseudo-joystick receiving an input of an arbitrary direction and an arbitrary quantity, and (iii) the joystick graphic is disposed at the center of the directional keys graphic in the combined GUI image area;
an information processing unit operative to perform information processing in accordance with an operation made to the at least one of the first and second GUI operation areas by a user;
a display device operative to display the combined GUI image, and the at least first and second GUI operation areas as an on-screen display on an output image generated as a result of information processing performed in the information processing device;
a touch panel operative to cover the display device and operative to detect a position where a user makes contact with the display device; and
an operation information converting unit operative to identify an operation performed by the user based on a correspondence relationship between a contact point detected by the touch panel and the GUI image being displayed, such that when the user makes contact with one of the at least first and second GUI graphics within the combined GUI image area on the touch panel, the corresponding one of the at least first and second GUI operation areas is selected and is displayed in place of the combined GUI image area, wherein:
when the user selects the second GUI graphic within the combined GUI image area and the second GUI operation area is displayed in place of the combined GUI image area, the GUI image generating unit operates to display at least a portion of the first GUI graphic from the combined GUI image area within the second GUI operation area, such that a touch selection by the user of the at least a portion of the first GUI graphic causes the first GUI operation area to be displayed in place of the second GUI operation area, and
when the user selects the first GUI graphic within the combined GUI image area and the first GUI operation area is displayed in place of the combined GUI image area, the GUI image generating unit operates to prohibit display of any graphic that would permit a touch selection by the user to cause the second GUI operation area to be displayed in place of the first GUI operation area.

11. An input value acquiring method comprising:
generating a GUI (Graphical User Interface) image, including at least one combined GUI image area, wherein the combined GUI image area includes at least a first GUI graphic and a second GUI graphic, representing at least a first GUI operation area and a second GUI operation area, respectively, wherein: (i) the second GUI graphic includes a directional keys graphic that corresponds to the second GUI operational area, which includes directional keys, wherein a plurality of direction instruction keys are disposed on the circumference of a circle, (ii) the first GUI graphic includes a joystick graphic that corresponds to the first GUI operational area, which includes a pseudo-joystick receiving an input of an arbitrary direction and an arbitrary quantity, and (iii) the joystick graphic is disposed at the center of the directional keys graphic in the combined GUI image area;
displaying the combined GUI image, and the at least first and second GUI operation areas on a display device as an on-screen display on an output image generated as a result of information processing;

detecting, by the touch panel that cover the display device, a position where a user makes contact; and identifying an operation performed by the user based on a correspondence relationship between a detected contact point and a GUI image being displayed, such that when the user makes contact with one of the at least first and second GUI graphics within the combined GUI image area on the touch panel, the corresponding one of the at least first and second GUI operation areas is selected and is displayed in place of the combined GUI image area, wherein:

when the user selects the second GUI graphic within the combined GUI image area and the second GUI operation area is displayed in place of the combined GUI image area, at least a portion of the first GUI graphic from the combined GUI image area is displayed within the second GUI operation area, such that a touch selection by the user of the at least a portion of the first GUI graphic causes the first GUI operation area to be displayed in place of the second GUI operation area, and when the user selects the first GUI graphic within the combined GUI image area and the first GUI operation area is displayed in place of the combined GUI image area, no graphic is displayed that would permit a touch selection by the user to cause the second GUI operation area to be displayed in place of the first GUI operation area.

12. A non-transitory computer-readable recording medium containing a computer program, the computer program being executable by, and causing, a computer to carry out one or more actions, comprising:

generating a GUI (Graphical User Interface) image, including at least one combined GUI image area, wherein the combined GUI image area includes at least a first GUI graphic and a second GUI graphic, representing at least a first GUI operation area and a second GUI operation area, respectively, wherein: (i) the second GUI graphic includes a directional keys graphic that corresponds to the second GUI operational area, which includes directional keys, wherein a plurality of direction instruction keys are disposed on the circumference of a circle, (ii) the first GUI graphic includes a joystick graphic that corresponds to the first GUI operational area, which includes a pseudo-joystick receiving an input of an arbitrary direction and an arbitrary quantity, and (iii) the joystick graphic is disposed at the center of the directional keys graphic in the combined GUI image area;

displaying the combined GUI image, and the at least first and second GUI operation areas on a display device as an on-screen display on an output image generated as a result of information processing;

identifying an operation performed by the user based on a correspondence relationship between a contact point detected by the touch panel that covers the display device and a GUI image being displayed, such that when the user makes contact with one of the at least first and second GUI graphics within the combined GUI image area on the touch panel, the corresponding one of the at least first and second GUI operation areas is selected and is displayed in place of the combined GUI image area, wherein:

when the user selects the second GUI graphic within the combined GUI image area and the second GUI operation area is displayed in place of the combined GUI image area, the module configured to generate a GUI image operates to display at least a portion of the first GUI graphic from the combined GUI image area within the second GUI operation area, such that a touch selection by the user of the at least a portion of the first GUI graphic causes the first GUI operation area to be displayed in place of the second GUI operation area, and when the user selects the first GUI graphic within the combined GUI image area and the first GUI operation area is displayed in place of the combined GUI image area, the module configured to generate a GUI image prohibits display of any graphic that would permit a touch selection by the user to cause the second GUI operation area to be displayed in place of the first GUI operation area.

13. The apparatus according to claim 1, wherein the combined GUI image area is represented such that the first GUI graphic is surrounded by the second GUI graphic.

14. The apparatus according to claim 1, wherein the GUI image generating unit operates to cause the combined GUI image area to at least one of fade away and disappear when the user selects at least one of the first and second GUI graphics within the combined GUI image area.

* * * * *